US009904633B2

(12) United States Patent
Qiu

(10) Patent No.: US 9,904,633 B2
(45) Date of Patent: Feb. 27, 2018

(54) DISPLAY SYSTEM AND OPERATION OPTIMIZATION METHOD

(71) Applicant: Wistron Corporation, New Taipei (TW)

(72) Inventor: JunXin Qiu, New Taipei (TW)

(73) Assignee: Wistron Corporation, New Taipei (TW)

(*) Notice: Subject to any disclaimer, the term of this patent is extended or adjusted under 35 U.S.C. 154(b) by 540 days.

(21) Appl. No.: 14/520,356

(22) Filed: Oct. 22, 2014

(65) Prior Publication Data
US 2015/0186303 A1    Jul. 2, 2015

(30) Foreign Application Priority Data

Dec. 31, 2013  (CN) .......................... 2013 1 0749960

(51) Int. Cl.
*G06F 3/00* (2006.01)
*H05K 7/10* (2006.01)
(Continued)

(52) U.S. Cl.
CPC .......... *G06F 13/102* (2013.01); *G09G 5/005* (2013.01); *G09G 5/006* (2013.01); *G09G 2370/10* (2013.01); *G09G 2370/12* (2013.01)

(58) Field of Classification Search
None
See application file for complete search history.

(56) References Cited

U.S. PATENT DOCUMENTS

2008/0007616 A1*  1/2008  Baladhandayuthapani  G06F 3/14
                                                                        348/14.12
2008/0174595 A1*  7/2008  Jatou ................... H01R 31/065
                                                                        345/418
(Continued)

FOREIGN PATENT DOCUMENTS

CN          101466008 A      6/2009
TW          I257254          6/2006
(Continued)

OTHER PUBLICATIONS

Office action dated May 25, 2015 for the Taiwan application No. 103103583, filing date: Jan. 29, 2014, p. 2 line 14-26, p. 3-5, p. 6 line 1-14 and line 17-26 and p. 7 line 1-19.
(Continued)

*Primary Examiner* — Hyun Nam
(74) *Attorney, Agent, or Firm* — Winston Hsu

(57) ABSTRACT

The present disclose provides a display system. The display system comprises a signal source unit a signal source unit, a transmission unit and a display unit. The signal source unit is complied with a first standard and used for providing an image signal. The transmission unit is coupled to the signal source unit, and used for transmitting the image signal, wherein the transmission unit has a plurality of pins. The display unit is complied with a second standard and coupled to the transmission unit. The display unit comprises a detection unit and a determination unit. The detection unit is used for detecting the plurality of pins. The determination unit is couple to the detection unit and used for determining voltage levels of the pins, determining the first standard according to the voltage level of the pins and configuring the display device into a corresponding mode according to the first standard.

22 Claims, 5 Drawing Sheets

(51) Int. Cl.
*G06F 13/10* (2006.01)
*G09G 5/00* (2006.01)

(56) References Cited

U.S. PATENT DOCUMENTS

| | | | |
|---|---|---|---|
| 2012/0064758 A1* | 3/2012 | Grice | H01R 13/641 439/490 |
| 2012/0084479 A1* | 4/2012 | Hale | G06F 13/409 710/301 |
| 2012/0200779 A1* | 8/2012 | Lin | H04N 21/43632 348/706 |

FOREIGN PATENT DOCUMENTS

| | | |
|---|---|---|
| TW | 200920121 | 5/2009 |
| TW | I319958 | 1/2010 |
| TW | 201236454 | 9/2012 |

OTHER PUBLICATIONS

Office action dated Oct. 9, 2016 for CN application No. 201310749960.3, p. 3 line 6-31, p. 4-5 and p. 6 line 1-22.

\* cited by examiner

| HDMI | | HDMI | DP++ | | DP++ | |
| --- | --- | --- | --- | --- | --- | --- |
| Pin | Signal Type | Pin | Pin | Pin | Signal Type | |
| 1 | DATA 2+ | 1 | 1 | 1 | Lane 3(N) | |
| 2 | GNO | 2 | 2 | 2 | GNO | |
| 3 | DATA 2- | 3 | 3 | 3 | Lane 3(P) | |
| 4 | DATA 1+ | 4 | 4 | 4 | Lane 2(N) | |
| 5 | GNO | 5 | 5 | 5 | GNO | |
| 6 | DATA 1- | 6 | 6 | 6 | Lane 2(P) | |
| 7 | DATA 0+ | 7 | 7 | 7 | Lane 1(N) | |
| 8 | GNO | 8 | 8 | 8 | GNO | |
| 9 | DATA 0- | 9 | 9 | 9 | Lane 1(P) | |
| 10 | CLOCK+ | 10 | 10 | 10 | Lane 0(N) | |
| 11 | GNO | 11 | 11 | 11 | GNO | |
| 12 | CLOCK- | 12 | 12 | 12 | Lane 0(P) | |
| 13 | CEC | 13(NC) | N/A | 13 | CONFIG1 | |
| 14 | NC | 14(NC) | 14(NC) | 14 | CONFIG2 | |
| 15 | SCL | 15 | 15 | 15 | AUX Channel(P) | |
| 16 | SDA | 16 | 17 | 16 | GNO | |
| 17 | GNO | 17 | 16 | 17 | AUX Channel(N) | |
| 18 | +SV PWR | 18 | 13 | 18 | Hot Plug DET | |
| 19 | Hot Plug DET | 19 | 18 | | | |
| | | | 19(NC) | 19 | RTN | |
| | | | 20(NC) | 20 | DP_PWR | |

FIG. 2

| HDMI | | HDMI | DP++ | DP++ | |
|---|---|---|---|---|---|
| Pin | Signal Type | Pin | Pin | Pin | Signal Type |
| 1 | DATA 2- | 1 | 1 | 1 | Lane 3(N) |
| 2 | DATA 2+ | 2 | 3 | 2 | GNO |
| 3 | GNO | 3 | 2 | 3 | Lane 3(P) |
| 4 | DATA 4- | 4(NC) | N/A | 4 | Lane 2(N) |
| 5 | DATA 4+ | 5(NC) | N/A | 5 | GNO |
| 6 | SCL | 6 | 15 | 6 | Lane 2(P) |
| 7 | SDA | 7 | 17 | 7 | Lane 1(N) |
| 8 | NC | 8(NC) | N/A | 8 | GNO |
| 9 | DATA 1- | 9 | 4 | 9 | Lane 1(P) |
| 10 | DATA 1+ | 10 | 6 | 10 | Lane 0(N) |
| 11 | GNO | 11 | 5 | 11 | GNO |
| 12 | DATA 3- | 12(NC) | N/A | 12 | Lane 0(P) |
| 13 | DATA 3+ | 13(NC) | N/A | 13 | CONFIG1 |
| 14 | +SV PWR | 14 | 13 | 14 | CONFIG2 |
| 15 | GNO(for+SV) | 15 | 16 | 15 | AUX Channel(P) |
| 16 | Hot Plug DET | 16 | 18 | 16 | GNO |
| 17 | DATA 0- | 17 | 7 | 17 | AUX Channel(N) |
| 18 | DATA 0+ | 18 | 9 | 18 | Hot Plug DET |
| 19 | GNO | 19 | 8 | 19 | RTN |
| 20 | DATA 5- | 20(NC) | N/A | 20 | DP_PWR |
| 21 | DATA 5+ | 21(NC) | 20(NC) | | |
| 22 | GNO | 22 | 11 | | |
| 23 | CLK+ | 23 | 12 | | |
| 24 | CLK- | 24 | 20 | | |

FIG. 3

| MHL | | | MHL | DP++ | | DP++ | |
| --- | --- | --- | --- | --- | --- | --- | --- |
| Pin | Signal Type | | Pin | Pin | | Pin | Signal Type |
| 1 | VBUS | | 1 | 13 | | 1 | Lane 3(N) |
| 2 | MHL- | | 2 | 7 | | 2 | GNO |
| 3 | MHL+ | | 3 | 9 | | 3 | Lane 3(P) |
| 4 | CBUS | | 4 | 18 | | 4 | Lane 2(N) |
| 5 | GND | | 5 | 8 | | 5 | GNO |
| | | | | | | 6 | Lane 2(P) |
| | | | | | | 7 | Lane 1(N) |
| | | | | | | 8 | GNO |
| | | | | | | 9 | Lane 1(P) |
| | | | | | | 10 | Lane 0(N) |
| | | | | | | 11 | GNO |
| | | | | | | 12 | Lane 0(P) |
| | | | | | | 13 | CONFIG1 |
| | | | | | | 14 | CONFIG2 |
| | | | | | | 15 | AUX (P) |
| | | | | | | 16 | GNO |
| | | | | | | 17 | AUX (N) |
| | | | | | | 18 | Hot Plug DET |
| | | | | | | 19 | RTN |
| | | | | | | 20 | DP_PWR |

FIG. 4

DISPLAY SYSTEM AND OPERATION OPTIMIZATION METHOD

BACKGROUND OF THE INVENTION

1. Field of the Invention

The present invention relates to a display system and operation optimization method, and more particularly, to a display system and operation optimization method without an adaptor.

2. Description of the Prior Art

So far the current electronic devices have a higher and higher demand for the audio/video and data transmission, forcing the high speed transmission interface technology to keep improving. Some transmission interface technologies, for example digital visual interface (DVI), VGA, low voltage differential signaling (LVDS), are not able to meet the demands in the market. Although high definition multimedia interface (HDMI) has advantages of wide transmission bandwidth, digital data encryption and hybrid transmission for the audio and video, the authorization fee is prohibitive. Thus, display port interface technology which has high compatibility and no patent fee is overwhelming in the market.

In order to communicate with other interfaces, Display Port has developed an extension interface called Dual Mode Display Port (DP++).

SUMMARY OF THE INVENTION

It's therefore an objective of the present invention to provide a display system to achieve the best operation optimization.

The present invention discloses a display system. The display system comprises a signal source unit a signal source unit, a transmission unit and a display unit. The signal source unit is complied with a first standard and used for providing an image signal. The transmission unit is coupled to the signal source unit, and used for transmitting the image signal, wherein the transmission unit has a plurality of pins. The display unit is complied with a second standard and coupled to the transmission unit. The display unit comprises a detection unit and a determination unit. The detection unit is used for detecting the plurality of pins. The determination unit is couple to the detection unit and used for determining voltage levels of the plurality of pins, determining the first standard according to the voltage level of the plurality of pins, and configuring the display device into a corresponding mode.

The present invention further discloses an operation optimization method for a display device. The operation optimization method comprises receiving an image signal; detecting a plurality of pins of a transmission unit; determining voltage levels of the plurality of pins of the transmission unit; determining a source standard of the image signal according to the voltage levels of the plurality of pins; and configuring the display device into a corresponding mode according to the source standard of the image signal.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIGS. 2-4 are exemplary pin mapping diagrams for the transmission unit shown in FIG. 1.

DETAILED DESCRIPTION

Figure 1:
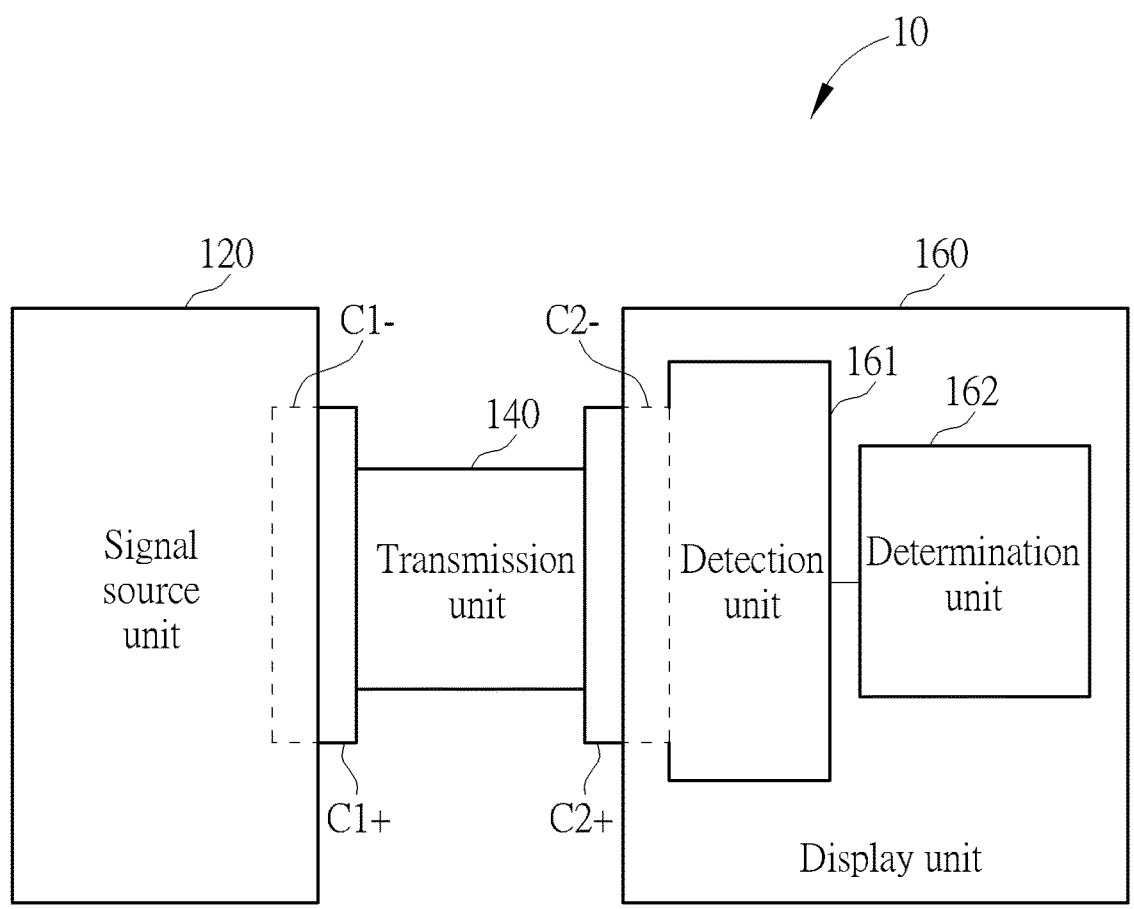
FIG. 1 is an exemplary display system.
Figure 5:
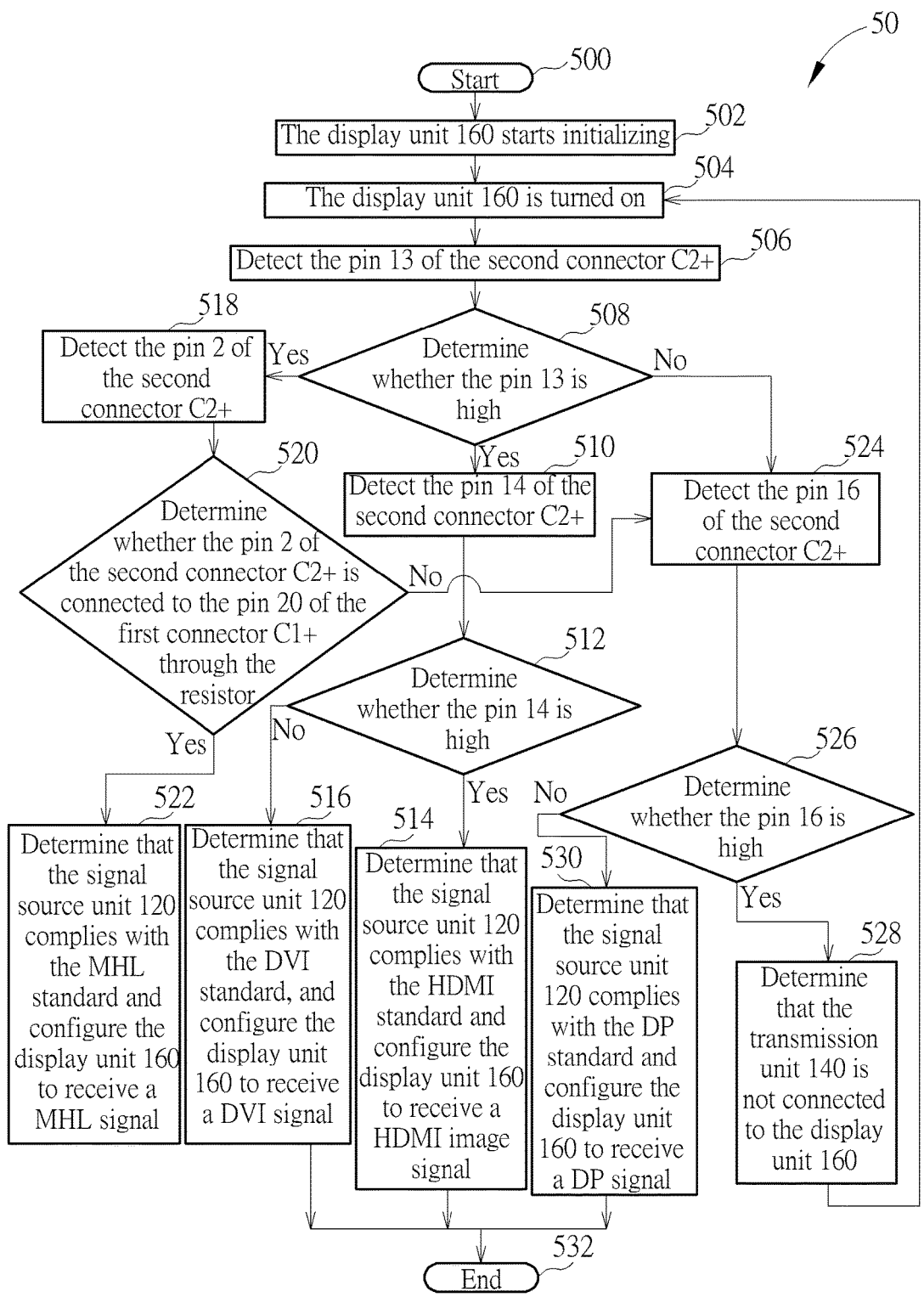
FIG. 5 is a flow chart of an exemplary process.

Please refer to FIG. 1, which is an exemplary display system 10. The display system 10 includes a signal source unit 120, a transmission unit 140 and a display unit 160. The signal source unit 120 is used for providing an image signal with a first format. Preferably, the signal source unit 120 could be a desktop, a DVD player, a laptop or a mobile phone and has a reception port C1−. The signal source unit 120 may comply with a High Definition Multimedia Interface (HDMI) standard, a Digital Visual Interface (DVI) standard, a Mobile High-Definition Link (MHL) standard or a Display Port (DP) standard. The transmission unit could be a transmission line, which has a first connector C1+ and a second connector C2+. The first connector C1+ is coupled to the signal source unit 120, and paired up with the reception port C1−. The display unit 160 includes a reception port C2−, a detection unit 161 and a determination unit 162. In some examples, the detection unit 161 could be implemented by a Level Shifting/Discovery circuit and the determination unit 162 could be implemented by a scaler circuit. The reception port C2− is coupled to the transmission unit 140 and paired up with the second connector C2+. The detection unit 161 is used for detecting multiple pins on the second connector C2+ and providing the detected signal for the determination unit 162 and performing voltage switch according to a signal mode. The determination unit 162 is coupled to the detection 162 for determining voltage levels of multiple pins on the second connector C2+ and determining which standard is used in the signal source unit 120 according to the voltage levels of pins on the connector C2+ and configuring the display unit 160 to a second format according to the first format of the image signal and correspondingly controlling the detection unit 161. The display unit 160 complies with a Dual mode Display Port (DP++) standard and the display unit 160 can configures itself to a corresponding format. Therefore, a user does not need to purchase an adaptor, which facilitates the operation and reduces the cost.

The detailed operation of the display system 10 is elaborated in as follows. The display unit 160 starts initializing after the display unit 160 is plugged in a power outlet. The display unit 160 is turned on when the power button is hit. The determination unit 162 controls the detection unit 161 to perform detection. When the detection unit 161 receives a status of a pin 13 on the second connector C2+ the detection unit 161 detects the voltage level of the pin 13. If the voltage level of the pin 13 is high, the detection unit 161 further detects a status of a pin 14 on the second connector C2+. If the pin 14 is high, the determination unit 162 determines that the signal source unit 120 complies with the HDMI standard and configures a signal input into a HDMI mode. If the pin 14 is low, the determination 162 determines that the signal source unit 120 complies with the DVI standard and configures the signal input into a DVI mode. If the Pin 13 is low, the determination unit 162 determines a status of a pin 2 on the connector C2+, whether the pin 2 is connected to a pin 20 on the connector C1+ through a resistor. If the pin 2 on the connector C2+ is connected to the pin 20 on the connector C1+ through the resistor, the determination unit 162 determines that the signal source unit 120 complies with the MHL standard and configures the signal input into a MHL mode. If the pin 2 on the connector C2+ is not connected to the pin 20 on the connector C1+ through the resistor, the determination unit 162 controls the detection unit 161 to detect a status of a pin 16 on the connector C2+. If the pin 16 is low, the determination unit 162 configures the signal input into a DP mode. If the pin 16 is high, the determination unit 162 determines that the transmission 140 is not connected to the display unit 160. Please note that the pins 13, 14, 16 and 20 are detected in the examples of the present disclosure, but not limited herein. Any pin which can be used to determine the HDMI, DVI, MHL or DP standard is included within the scope of this invention.

Please refer to FIG. 2, which is an exemplary pin mapping diagram 20 for the transmission unit 140. The left side of the pin mapping diagram 20 illustrates a pin layout for the HDMI standard while the right side of the pin mapping diagram 20 illustrates a pin layout for the DP++ standard. As seen in the pin mapping diagram 20, the pins 13 and 14 for the DP++ is not assigned for any purpose originally. Therefore, the present disclosure uses them to detect the transmission unit 140. Please further refer to FIGS. 3 and 4, which are exemplary pin mapping diagrams 30 and 40 for the transmission unit 140. The pin mapping diagrams 30 illustrates the mapping between the DVI pin layout and the DP++ pin layout. The pin mapping diagram 40 illustrates the mapping between the MHL pin layout the DP++ pin layout.

The operation of the display system 10 can be synthesized into a process 50. The process 50 is used in the display system and includes the following steps:

Step 500: Start.
Step 502: The display unit 160 starts initializing.
Step 504: The display unit 160 is turned on.
Step 506: Detect the pin 13 of the second connector C2+.
Step 508: Determine whether the pin 13 is high. If so, go to Step 510 or Step 518; otherwise, go to Step 524.
Step 510: Detect the pin 14 of the second connector C2+.
Step 512: Determine whether the pin 14 is high. If so, go to Step 514; otherwise, go to Step 516.
Step 514: Determine that the signal source unit 120 complies with the HDMI standard and configure the display unit 160 to receive a HDMI image signal and go to Step 532.
Step 516: Determine that the signal source unit 120 complies with the DVI standard, and configure the display unit 160 to receive a DVI signal and go to Step 532.
Step 518: Detect the pin 2 of the second connector C2+.
Step 520: Determine whether the pin 2 of the second connector C2+ is connected to the pin 20 of the first connector C1+ through the resistor. If so, go to Step 522; otherwise, go to Step 524.
Step 522: Determine that the signal source unit 120 complies with the MHL standard and configure the display unit 160 to receive a MHL signal.
Step 524: Detect the pin 16 of the second connector C2+.
Step 526: Determine whether the pin 16 is high. If so, go to Step 528; otherwise, go to Step 504.
Step 528: Determine that the transmission unit 140 is not connected to the display unit 160, go to Step 504.
Step 530: Determine that the signal source unit 120 complies with the DP standard and configure the display unit 160 to receive a DP signal, and go to Step 532.
Step 532: End.

The detail description of the process 50 can be found above, and thus omitted herein.

To sum up, the exemplary display system of the present disclosure can connect the display unit using the DP++ standard and the signal source unit using other interface standards as well as provides a simpler user interface. The users can operate the display system easily without purchasing an extra adaptor.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A display system, comprising:
a signal source unit complied with a first standard of a plurality of standards, for providing an image signal;
a transmission unit coupled to the signal source unit, for transmitting the image signal, wherein the transmission unit has a plurality of pins;
a display unit complied with a second standard different to the plurality of standards, coupled to the transmission unit, the display unit comprising:
a detection unit for detecting signals of the plurality of pins; and
a determination unit couple to the detection unit, for determining voltage levels of the plurality of pins, to select the first standard from the plurality of standards, and configuring the display device into a mode corresponding to the first standard.

2. The display system of claim 1, wherein the plurality of standards comprise a High Definition Multimedia Interface (HDMI), a Digital Visual Interface (DVI), a Mobile High-Definition Link (MHL) or a Display Port (DP) standard, and the second standard comprises a Dual mode Display Port (DP++) standard.

3. The display system of claim 1, wherein when the determination unit determines that a first pin of the plurality of pins is in a low voltage level, the detection unit detects a second pin of the plurality of pins, wherein the second pin is used for determining whether the first standard is a Display Port (DP) standard.

4. The display system of claim 3, wherein the determination unit determines that the first standard is the DP standard when the second pin is determined to be in a low voltage level.

5. The display system of claim 3, wherein the determination unit further determines that the transmission unit is not connected when the second pin is determined to be in a high voltage level.

6. The display system of claim 1, wherein when the determination unit determines that a first pin of the plurality of pins is in a high voltage level, the detection unit starts detecting a third pin of the plurality of pins, wherein the third pin is used for determining whether the first standard is a HDMI standard.

7. The display system of claim 6, wherein the determination unit determines that the first stand is the HDMI standard when the third pin is determined to be in a high voltage level.

8. The display system of claim 7, wherein the determination unit determines that the first standard is a DVI standard when the third pin is determined to be in a low voltage level.

9. The display system of claim 1, wherein when the determination unit determines that a firs pin of the plurality of pins is in a high voltage level, the detection unit starts detecting a fourth pin of the plurality of pins, wherein the fourth is used for determining whether the first standard is a MHI standard.

10. The display system of claim 1, wherein the determination unit determines that the first standard is the MHI standard when the fourth pin is connected to a fifth pin of the plurality of pins.

11. An operation optimization method for a display device, the operation optimization method comprising:
receiving an image signal complied with a first standard of a plurality of standards, wherein the display device is complied with a second standard different to the plurality of standards;
detecting signals of a plurality of pins of a transmission unit by a detection unit;
determining voltage levels of the plurality of pins of the transmission unit by a determining unit to select the first standard from the plurality of standards; and
configuring the display device into a mode corresponding to the first standard of the image signal.

12. The operation optimization method of claim 11, wherein the plurality of standards comprise a High Definition Multimedia Interface (HDMI), a Digital Visual Interface (DVI), a Mobile High-Definition Link (MHL) or a Display Port (DP) standard, and the second standard comprises a Dual mode Display Port (DP++) standard.

13. The operation optimization method of claim 11, wherein the step of detecting the plurality of pins of the transmission unit comprises when a first pin of the plurality of pins is determined to be in a low voltage level, starting detecting a second pin of the plurality of pins, wherein the second pin is used for determining whether the first standard is a Display Port (DP) standard.

14. The operation optimization method of claim 13, wherein the step of determining the source standard of the image signal according to the voltage levels of the plurality of pins comprises determining that the source standard is a DP standard when the second pin is determined to be in a low voltage level.

15. The operation optimization method of claim 13 further comprising: determining that the transmission unit is not connected when the second pin is determined to be in a high voltage level.

16. The operation optimization method of claim 11, wherein the step of detecting the plurality of pins of the transmission unit comprises when a first pin of the plurality of pins is determined to be in a high voltage level, starting detecting a third pin of the plurality of pins, wherein the third pin is used for determining whether the source standard is a HDMI standard.

17. The operation optimization method of claim 16, wherein the step of determining the source standard of the image signal according to the voltage levels of the plurality of pins comprises determining that the source stand is the HDMI standard when the third pin is determined to be in a high voltage level.

18. The operation optimization method of claim 16, wherein the step of determining the source standard of the image signal according to the voltage levels of the plurality of pins comprises determining that the first standard is a DVI standard when the third pin is determined to be in a low voltage level.

19. The operation optimization method of claim 11, wherein the step of detecting the plurality of pins of the transmission unit comprises when a firs pin of the plurality of pins is determined to be in a high voltage level, starting detecting a fourth pin of the plurality of pins, wherein the fourth is used for determining whether the first standard is a MIR standard.

20. The operation optimization method of claim 19 further comprising determining that the source standard is the MIR standard when the fourth pin is connected to a fifth pin of the plurality of pins.

21. The display system of claim 1, wherein the detection unit is a level shifting or a discovery circuit and the determination unit is a scaler circuit.

22. The operation optimization method of claim 11, wherein the detecting unit is a level shifting or a discovery circuit and the determination unit is a scaler circuit.

* * * * *